UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

POLYAZO DYE.

SPECIFICATION forming part of Letters Patent No. 515,897, dated March 6, 1894.

Application filed August 31, 1893. Serial No. 484,416. (Specimens.) Patented in France December 2, 1892, No. 226,107, and March 13, 1893, No. 228,593; in Germany March 14, 1893, No. 71,377, and in England April 13, 1893, No. 20,979, and April 27, 1893, No. 8,511.

*To all whom it may concern:*

Be it known that I, JOHANN JAKOB BRACK, a citizen of the Swiss Republic, residing at Basle, Switzerland, have invented certain new and useful Improvements in the Manufacture of Yellow Polyazo Coloring-Matters or Dyes, (for which I have been granted Letters Patent in France, No. 228,593, dated March 13, 1893, with Letters Patent of addition, dated April 13, 1893, and No. 226,107, dated December 2, 1892; in England, No. 8,511, dated April 27, 1893, and No. 20,979, dated under the International Convention April 13, 1893, and in Germany, No. 71,377, dated March 14, 1893;) and I do hereby declare the following to be a full, clear, and exact description of the said invention.

This invention has for its object the production of new polyazo-coloring matters derived from dioxydiphenylmethane, which latter is obtained by the condensation of formic-aldehyde with ordinary phenol in the presence of a condensation agent such as hydrochloric acid, for example.

These new coloring matters are obtained by the combination of one molecule of dioxydiphenylmethane with two molecules of diazo-compound, of which one compound at least is the intermediate product resulting from the combination of one molecule of salicylic acid with one molecule of the tetrazo-derivative of a paradiamido base, such for example, as benzidin, tolidin, or formaldehyde-tolidin, this latter being a condensation product of formic-aldehyde with tolidin. The two molecules of diazo-compounds may be the same or different; one of them may be a simple diazo body such as chlorid of diazo benzene, diazobenzene-sulfonic acid, &c.

These coloring matters, which all contain three or four diazo groups, are all brownish or yellowish brown powders; they dye unmordanted cotton yellow in an alkaline bath and when dissolved in concentrated sulfuric acid impart generally a violet or reddish violet tint.

I attribute to the coloring matter obtained with one molecule of dioxydiphenylmethane and two molecules of the intermediate product resulting from the union of equivalent quantities of tetrazodiphenyl and salicylic acid, the following formula:

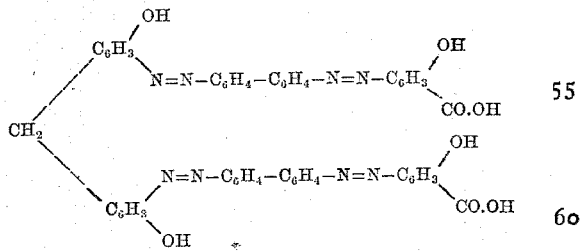

As to the constitution of the reaction product obtained with one molecule of dioxydiphenylmethane, one molecule of chlorid of diazobenzene and one molecule of the intermediate product resulting from the union of equivalent quantities of tetrazodiphenyl and salicylic acid, it may perhaps be represented by the following formula:

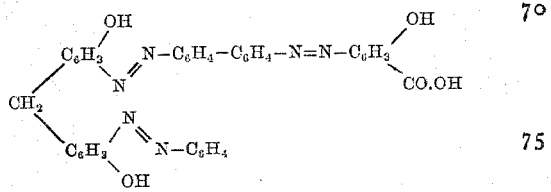

I will now give some examples of the preparation of these analogous coloring matters of which the preceding formula constitute types.

I. *Preparation of a coloring matter obtained with one molecule of dioxydiphenylmethane and two molecules of the intermediate product resulting from the union of equivalent quantities of tetrazoditolyl, or tetrazodiphenyl and salicylic acid.*—21.2 kilos of tolidin, or 18.4 kilos of benzidin, are transformed in a known manner into the tetrazo-derivative by means of sixty kilos hydrochloric acid at 21° Baumé and 13.8 kilos of sodium nitrite. The tetrazoditolyl, or tetrazodiphenyl thus obtained is poured into a solution containing 13.8 kilos of salicylic acid and sixty kilos of sodium carbonate, care being taken to agitate the liquid. The intermediate product formed at the end of two or three hours is introduced into a solution of ten kilos of dioxy-diphenylmethane and 3.5 kilos of caustic soda in about five hundred liters of water. The mixture is let stand for about twelve hours after which it is heated to boiling and the coloring matter precipitated with sea salt. The precipitate is then collected and dried. This coloring matter is soluble in hot water.

II. *Preparation of a coloring matter obtained with one molecule of dioxydiphenylmethane, one molecule of the intermediate product resulting from the union of equivalent quantities of tetrazodiphenyl, or tetrazoditolyl, and salicylic acid and one molecule of diazobenzene chlorid.*—The intermediate product described in Example I, is introduced into a solution of twenty kilos of dioxydiphenylmethane and seven kilos of caustic soda in about eight hundred kilos of water. After a short time there are added forty kilos of sodium carbonate and a solution of diazo-benzene chlorid prepared by means of 9.3 kilos of anilin, thirty kilos of hydrochloric acid and 6.9 kilos of sodium nitrite. After the mass has been allowed to stand for about twelve hours at the ordinary temperature, it is heated to the boiling point to complete the reaction and the coloring matter separated by filtration and dried. This coloring matter is readily soluble in hot water.

III. *Preparation of a coloring matter obtained with one molecule of dioxydiphenylmethane one molecule of the intermediate product resulting from the union of equivalent quantities of tetrazodiphenyl, or tetrazoditolyl and salicylic acid, and one molecule of the intermediate product resulting from the union of equivalent quantities of tetrazodiphenyl and sulfanilic acid.*—The product mentioned in Example II and obtained by the combination of one molecule of dioxydiphenylmethane with one molecule of an intermediate product resulting from the union of equivalent quantities of terazodiphenyl and salicylic acid, has added to it forty kilos of sodium carbonate, and to this mixture is then added the intermediate product formed by the union of equivalent quantities of tetrazodiphenyl and sulfanilic acid and obtained by means of 18.4 kilos of benzidin, sixty kilos of hydrochloric acid, 13.8 kilos of sodium nitrite, 19.5 kilos of sulfanilate of soda and 40 kilos of sodium acetate. At the end of about twelve hours the product of reaction is heated to the boiling point, the coloring matter formed precipitated by sea salt, and the precipitate dried. This precipitate is soluble in hot water.

IV. *Preparation of a coloring matter obtained with one molecule of dioxydiphenylmethane and two molecules of the intermediate product formed by one molecule of salicylic acid and one molecule of the tetrazo-derivative of the condensation product of tolidin with formic-aldehyde.*—21.8 kilos of tolidin-formaldehyde,—that is to say, of the condensation product of tolidin with formic-aldehyde—are diazotized in the known way by means of forty kilos of hydrochloric acid at 21° Baumé and seven kilos of sodium nitrite. The tetrazo-derivative thus obtained is poured into a solution containing 7.5 kilos of salicylic acid and sixty kilos of caustic soda at thirty per cent. in three hundred liters of water, care being taken to agitate the mixture. The intermediate product which will be formed in two or three hours appears as a dark brown precipitate. This precipitate is added to a solution of five kilos of dioxdiphenylmethane and five kilos of caustic soda in about two hundred liters of water. The new coloring matter will be found as a precipitate of a clear reddish brown color, which is separated by filtration, washed with water until the water has a neutral reaction, pressed and dried. This coloring matter is soluble in hot water. On heating it with soda lye it becomes partially decomposed, disengaging formic-aldehyde. Its constitution is indicated by the following formula:

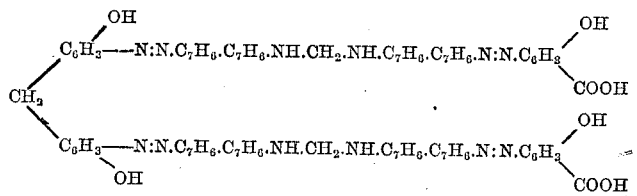

V. *Preparation of a coloring matter obtained with one molecule of dioxydiphenylmethane one molecule of the intermediate product resulting from the combination of a molecule of salicylic acid and a molecule of the tetrazo-derivative of the condensation product of tolidin with formic-aldehyde, and one molecule of chlorid of diazobenzene.*—The intermediate product obtained as set forth in the preceding example (IV) is added to a solution of ten kilos of dioxydiphenylmethane and ten kilos of caustic soda in about four hundred liters of water. The mixture is allowed to stand for some time, after which there is added to it a solution of chlorid of diazobenzene prepared with 4.6 kilos of anilin, fifteen kilos of hydrochloric acid and 3.5 kilos of sodium nitrite. The mass soon becomes lemon yellow in color and the triazo coloring matter is soon formed. This coloring matter is not easily soluble in hot water and is preferably used for dyeing in the form of paste.

VI. *Preparation of a coloring matter obtained with one molecule of dioxydiphenylmethane one molecule of the intermediate product resulting from the combination of a molecule of salicylic acid and a molecule of the tetrazo-derivative of the condensation product*

*of tolidin and formic-aldehyde, and one molecule of diazobenzol sulfonic acid.*—In preparing this coloring matter, for the 4.6 kilos of anilin of the preceding example (V) are substituted 9.7 kilos of sulfanilate of soda. In other respects the operations are the same as in Example V. The triazo-coloring matter obtained is not easily soluble in hot water and is preferably used in the form of paste. On heating this coloring matter with soda lye, it also will be partially decomposed as in the case of the product of the last example.

Having thus described my invention, I claim—

1. The herein described method of making yellow polyazoic coloring matters, which consists in combining a molecule of dioxydiphenylmethane with two molecules of diazo-compounds, of which one at least is the intermediate product resulting from the union of a molecule of salicylic acid and a molecule of the tetrazo-derivative of a paradiamido-base, such for example as benzidin, tolidin and formaldehyde-tolidin as set forth.

2. The herein described method of making polyazoic coloring matters, which consists in combining a molecule of dioxydiphenylmethane with two molecules of the intermediate product resulting from the union of a molecule of salicylic acid and a molecule of the tetrazo-derivative of a paradiamido-base, such as benzidin, tolidin and formaldehyde-tolidin, as set forth.

3. The herein described yellow polyazoic coloring matter derived from dioxydiphenylmethane which is, in its dry state, a brown powder, soluble in hot water and capable of dyeing unmordanted cotton yellow in an alkaline bath, and which, when dissolved in concentrated sulfuric acid imparts a violet color to the solution, as set forth.

In witness whereof I have hereunto signed my name in the presence of two subscribing witnesses.

JOHANN JAKOB BRACK.

Witnesses:
GEORGE GIFFORD,
AMAND RITTE.